Oct. 10, 1967 J. J. McCARTHY 3,345,711
RELEASABLE MECHANICAL COUPLING
Filed Aug. 19, 1964 2 Sheets-Sheet 2
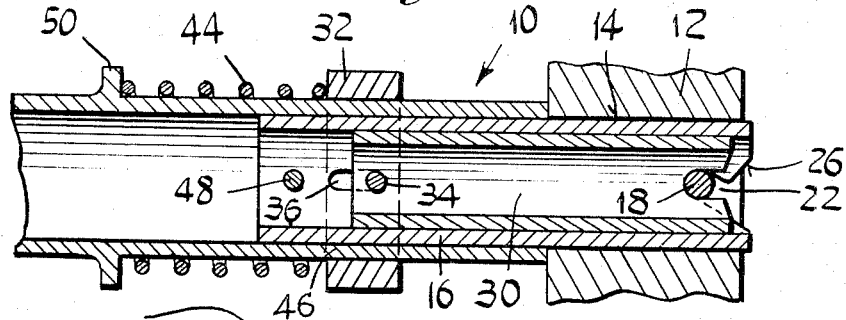
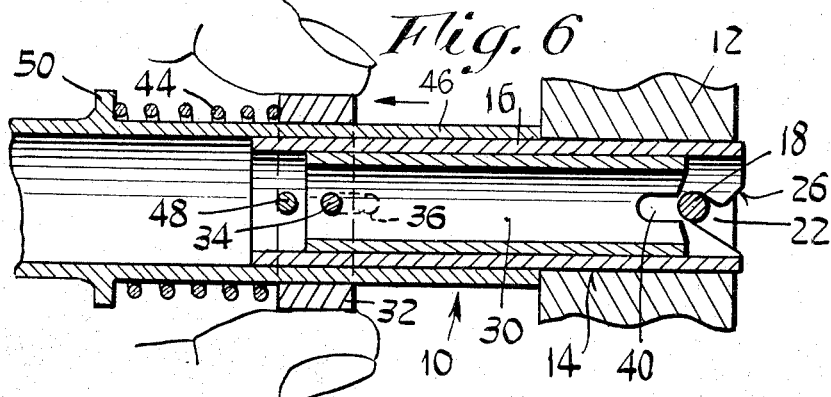
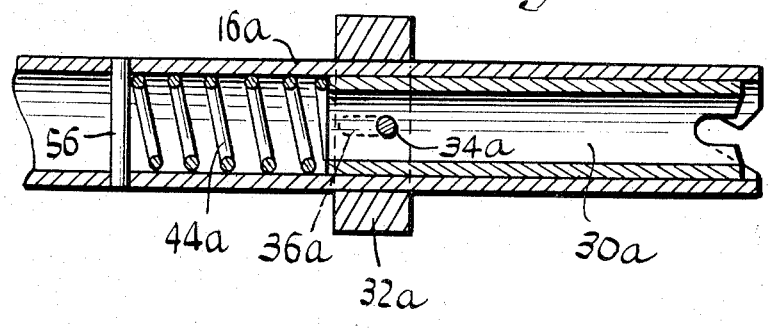
INVENTOR.
John J. McCarthy
BY
H. Gibner Lehmann
AGENT

# United States Patent Office 3,345,711
Patented Oct. 10, 1967

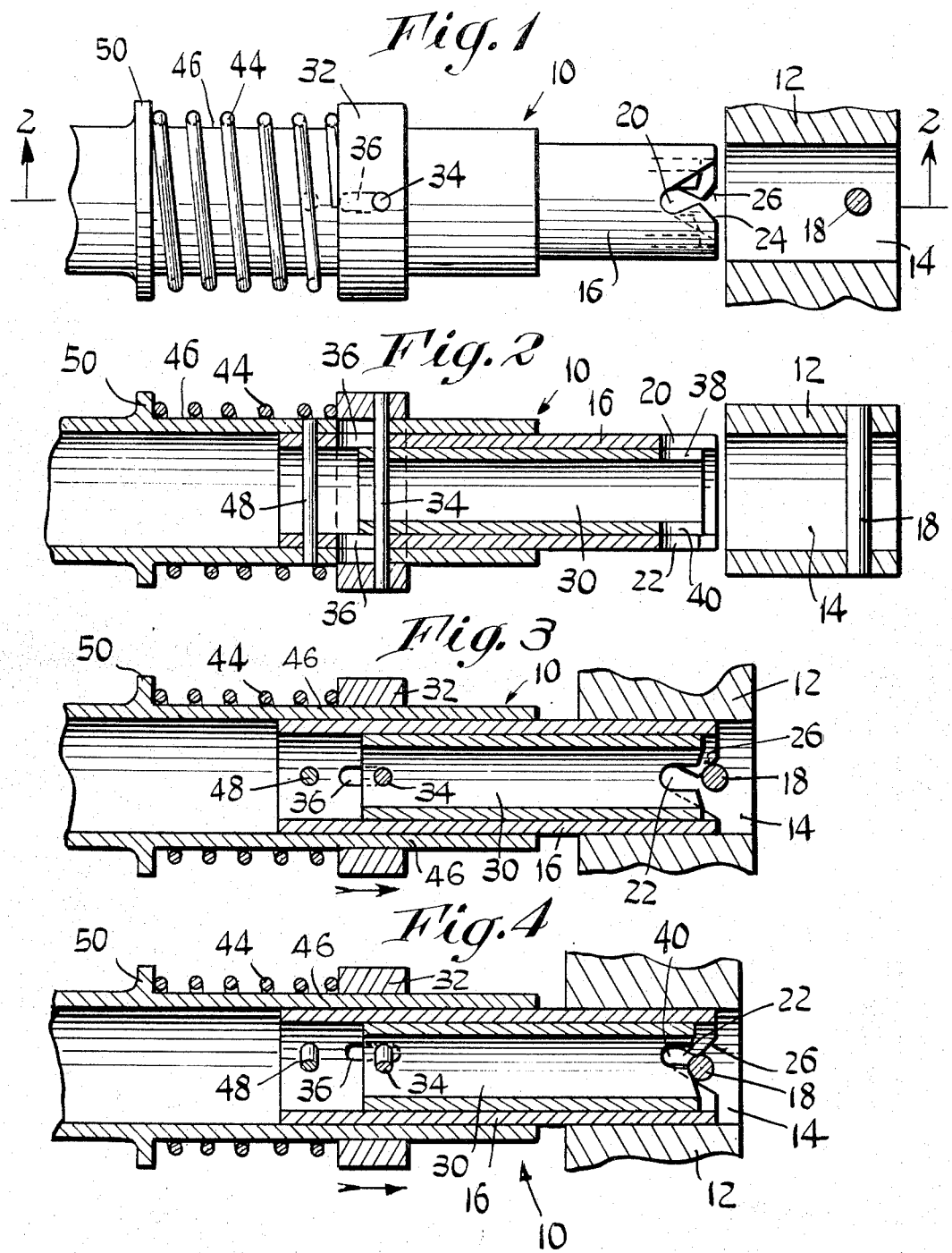

3,345,711
RELEASABLE MECHANICAL COUPLING
John J. McCarthy, Weston, Conn., assignor to Norco Incorporated, Ridgefield, Conn., a corporation of Connecticut
Filed Aug. 19, 1964, Ser. No. 390,617
1 Claim. (Cl. 24—230)

This invention relates to separable mechanical couplings, and more particularly to quick-connect and -disconnect couplings of the plug-and-socket type.

The invention concerns improvements in the mechanical coupling described and claimed in my copending application, Ser. No. 360,356 filed Apr. 16, 1964, now Patent No. 3,280,439, and entitled, "Mechanical Coupling." In this copending application there is disclosed a coupling comprising a receiver or female part having a socket, and a cooperable male part which latter is characterized by a locking plug having an axially movable locking and release sleeve adapted to occupy either of two positions on the locking plug, an advanced locking position and a retracted releasing position. The locking plug is a loose fit in the socket of the receiver or female part at the time of insertion, and the looseness or play is taken up by the locking and release sleeve which also is adapted to extend into the socket.

The provision of the loose fit of the plug in the socket was necessitated by the plug end having an angularly extended slot or notch which received a locking diametric pin of the socket. As the pin was being accommodated in the notch, the angularity of the latter required that the plug shift laterally as well as axially during its entry into the socket. Upon completion of the entry of the plug in the socket, the plug occupied a centralized position whereby the locking and release sleeve could shift to its advanced locking position, occupying the space surrounding the plug, between the latter and the walls of the socket.

In accordance with the present invention a quick-connect and -disconnect mechanical coupling of the general type disclosed in my identified copending application is provided. However, the locking plug does not have looseness in the socket of the receiver part but instead snugly slidably fits in said socket. The locking and release sleeve thus does not also enter the socket of the receiver part, but instead when shifted to its advanced locking position merely abuts the adjoining surface of the receiver part.

Accordingly, one object of the invention is to provide a novel and improved quick-connect and -disconnect mechanical coupling of the plug-and-socket type, wherein the locking plug part has a smooth sliding fit without excessive looseness in the socket of the receiver part, thereby eliminating the necessity for the locking and release sleeve to enter the socket and eliminating any necessity for the plug part when inserted to have lateral movement by which it can become centralized.

Another object of the invention is to provide an improved mechanical coupling as above set forth, which is extremely effective in remaining locked or coupled despite appreciable forces which tend to separate the coupling parts.

In effecting the insertion and locking of the plug part in the socket part a relative twisting or turning movement is resorted to between these parts. That is, either the plug part may be slightly twisted as it is axially extended into the socket, or else the socket part may be slightly twisted or turned during the insertion of the plug in the socket of the receiver part. In each instance the coupling is characterized by a simultaneous advance and twist of turning movement of the parts as these are brought together, and by such organization the assembly and effective locking of the parts are easily and quickly carried out.

A feature of the invention resides in the provision of an improved quick-connect and -disconnect mechanical coupling as outlined, wherein relatively few parts or components are required, such parts being readily, economically fabricated, and being reliable and foolproof in their operation.

Another feature of the invention resides in the provision of a coupling as above outlined, wherein but little skill or know-how is required to effect the attachment of the coupling parts or the separation of the same.

Other features and advantages will hereinafter appear.

In the drawings accompanying this specification, similar characters of reference are used to designate like components throughout the several views, in which:

FIG. 1 is a view partly in side elevation and partly in axial section, of the improved quick-connect and -disconnect coupling device as provided by the invention, the parts being shown separated. The plug part and assemblage of the coupling device is shown in side elevation whereas the receiver part is shown in axial section.

FIG. 2 is an axial sectional view of the mechanical coupling of FIG. 1, taken on the line 2—2 of FIG. 1.

FIG. 3 is an axial sectional view of the coupling parts illustrating an initial step in the assembly of the plug part to the receiver part.

FIG. 4 is a view like that of FIG. 3, illustrating a later step in the assembly of the coupling parts.

FIG. 5 is a view like those of FIGS. 3 and 4, illustrating the final step in the assembly of the coupling parts.

FIG. 6 is an axial sectional view of the coupling, illustrating the initial release movement as effected by the operator, prior to the separation of the plug part from the receiver part.

FIG. 7 is an axial sectional view of a locking plug part or assemblage as provided by the invention and illustrating a modification thereof.

Referring now particularly to the drawings, the coupling as seen in FIGS. 1 and 2 comprises a plug part 10 and a receiver part 12, the latter having a recess or socket 14, which, in accordance with the invention, is arranged to snugly slidably receive a locking plug member 16. While a certain amount of looseness exists between the locking plug member 16 and the walls of the socket 14, such looseness is only for the purpose of providing for easy insertion and withdrawal of the plug part and is not such as to be considered excessive or for the purpose of accommodating any additional members.

The socket 14 and the locking plug 16 are cylindrical, whereby they may have relative turning or twisting movement as well as relative axial movement in accordance with the invention.

Within the socket 14 there is provided a locking projection or pin 18 which is centrally or diametrically disposed and arranged to cooperate with one or several slots or notches 20, 22 of the locking plug 16.

In accordance with the invention, the slots 20, 22 are angularly disposed not only with respect to each other but also with respect to the longitudinal axis of the plug 16. The slots 20, 22 may be considered as extending along two helices or imaginary screw threads of very large pitch. Also, the slots 20, 22 are symmetrical in that corresponding portions of the same are always diametrically opposite each other. That is, the inner ends of the slots 20, 22, being rounded as shown, are diametrically opposite each other so that they may accommodate the locking pin or projection 18 of the receiver part 12, as clearly illustrated in FIGS. 5 and 6. In order to attain such position, the pin 18 must enter the slots and travel therealong in conjunction with a relative twisting or turning movement between the receiver part 12 and the plug part 10, in accordance with this invention.

Preferably the slots 20, 22 have divergent mouth or entrance portions as effected by cut-back walls 24 and 26 respectively. Such enlarged entrance portions facilitate the locating of the locking pin 18 in the slots 20, 22, and this is illustrated in FIG. 3, wherein the wall 26 is engaged with the pin 18 and effects a camming action, tending to cause a clockwise turning of the plug member 16 as viewed from the left end of the figure, simultaneously with the axial movement of the plug member from left to right into the socket or recess 14.

It will thus be understood that by virtue of the angular disposition of the slots 20, 22 in conjunction with the turning movement of the plug 16 with respect to the receiver 12 it is possible to effect an insertion of the plug in the receiver without sidewise motion and in such a manner that the locking pin 18 occupies the inner ends of the slots 20, 22. This is a novel arrangement, as provided by the invention.

For the purpose of securely locking the plug part 10 (and specifically the plug 16) in the receiver part 12, a locking and release member 30 is provided, said member being slidably carried by the plug 16 and being axially positionable in either a locking position as shown in FIGS. 1 and 2 or else a releasing position as shown in FIG. 6. The locking and release member 30 is preferably disposed within the plug part 16 and is manually actuated by a release collar 32 slidably carried by the locking plug 16 on the exterior thereof. To establish a driving connection between the collar 32 and the locking and release member 30 an interconnecting pin 34 is provided, passing through clearance slots 36 in the plug 16 and suitably arranged close-fitting holes in the collar 32 and release member 30. The locking position of the collar 32 is indicated in FIGS. 1, 2 and 5, and the releasing position of the collar is shown in FIG. 6.

For the purpose of effecting the locking, the interconnecting pin 34 is utilized since it prevents relative turning between the locking plug 16 on the one hand and the locking and release member 30 on the other hand. Further, the release member 30 is provided with one or several straight slots 38, 40 adapted to receive the locking pin 18 when the coupling parts are in the assembled condition as shown in FIG. 5. Such engagement prevents turning of the release member 30 with respect to the receiver part 12, and consequently prevents turning of the locking plug 16 with respect to the receiver part 12.

Since the locking plug 16 is held against turning, and since a turning movement is required for it to be withdrawn from the socket 14, the plug 16 is securely retained in the locked position as shown in FIG. 5. However, a quick and easy release of the plug 16 is effected by merely withdrawing the release collar 32 in the manner indicated in FIG. 6, whereby the slots 38, 40 thereof will be withdrawn from the locking pin 18. Thus, turning restraint is removed from the locking plug 16 and since the latter is now free to have turning movement, it may be readily withdrawn by a simultaneous turning and axial movement, as will be readily understood.

The locking collar 32 is normally retained in the locking position shown in FIGS. 1, 2 and 5 by a coil spring 44 which is carried by an extension tube 46 fitting around the back end of the locking plug 16 and rigidly secured thereto by an interconnecting pin 48. The spring 44 bears against one end of the locking collar 32 and also bears against an annular shoulder or flange 50 on the tubular extension 46.

It will be understood that the means by which the locking plug 16 is prevented from having turning movement when the coupling is in the assembled condition shown in FIG. 5 comprises the locking and release member 30 having the slots 38, 40 which receive the locking pin 18 and having the pin and slot connection 34, 36 with the locking plug 16 whereby the restraint imposed on the latter against turning originates with the locking pin 18 stationarily mounted in the receiver part 12.

While a balanced construction is illustrated involving pairs of slots 20, 22 and 38, 40 it will be understood that single slots may be utilized to effect a locking and release of the plug 16 in the receiver part 12, and that other shapes may be provided just as long as the plug part is capable of turning or twisting in the receiver part simultaneously with the relative axial movement between said parts, to enable the locking pin to be accommodated in the locking slot or slots.

Instead of the spring 44 being located at the outside of the plug assemblage, it may be disposed within the plug assemblage, as by making the part 16, 46 in the form of a single tube, this construction being illustrated in FIG. 7. Here the tube 16a slidably carries the release collar 32a on its exterior and the locking plug part 30a at its interior. The spring 44a is within the tube 16a, engaging the part 30a and also a cross pin 56. The parts 32a and 30a are rigidly connected by the pin 34a passing through slot 36a in the tube 16a. Operation is similar to that already described.

It will now be understood from the foregoing that I have provided a novel and improved releasable mechanical coupling of the quick-connect and disconnect type, wherein the cooperable parts when brought together have simultaneously an axial and a twisting movement, one part being arranged to turn slightly with respect to the other part both in the assembly of the parts and in the release or disassembly of the parts. Relatively few components are required, and such components may be readily economically fabricated. The coupling is strong and sturdy in its construction and not likely to fail even when subjected to severe usage and powerful forces.

Variations and modifications may be made within the scope of the claim, and portions of the improvements may be used without others.

I claim:

A releasable mechanical coupling comprising, in combination:
  (a) a receiver part having a socket and a projection in the socket,
  (b) a plug part having a foremost end which is insertable and turnable in the socket of the receiver part and having a notch in said end, said notch being adapted to receive said projection and extending obliquely whereby it requires turning of the plug part in the socket as said part is advanced therein, and
  (c) an elongate locking and release member longitudinally movable on the plug part between advanced locking and retracted releasing positions,
  (d) keying means on the plug part and the locking and release member, preventing relative turning therebetween,
  (e) lock means on the release member, including an end portion and a slot therein engageable with the said projection and operative at the time that the member is in locking position to prevent turning of the plug part when the latter is in said socket with the projection fully received in said notch, thereby to lock the plug part in the receiver part,
  (f) spring means biasing the locking and release member to the advanced locking position,
  (g) said notch having divergent edges at its mouth which define a V-shaped entrance for the projection,
  (h) said plug part having divergent transverse end walls disposed at the mouth of the notch, one of said walls being positioned to require its engagement by the projection when the latter is being guided by and engaged with either of said divergent edges of the notch in preparation for entry of the projection fully into said notch, (i) said engagement of the said one transverse end wall by the projection guiding the latter into thte slot of the locking and release member and enabling the projection to effect a retracting longitudinal movement of said locking and release member against the action of said spring means.

References Cited

UNITED STATES PATENTS

| | | | |
|---|---|---|---|
| 1,241,713 | 10/1917 | Dahlqvist. | |
| 2,267,802 | 12/1941 | Purdy | 287—103 |
| 2,560,513 | 7/1951 | Lyon | 287—119 X |
| 2,680,636 | 6/1954 | Griffin | 287—119 |
| 2,948,383 | 8/1960 | Modrey | 24—211 X |

WILLIAM FELDMAN, *Primary Examiner.*

E. SIMONSEN, *Assistant Examiner.*